United States Patent [19]

Soma et al.

[11] Patent Number: 4,796,998
[45] Date of Patent: Jan. 10, 1989

[54] METHOD FOR MOBILE SURVEY OF ROAD SURFACE

[75] Inventors: Koroku Soma, Tokyo; Noritsugu Watanabe, Saitama; Wataru Taniguro, Tokyo, all of Japan

[73] Assignee: Pasco Corporation, Tokyo, Japan

[21] Appl. No.: 850,574

[22] Filed: Apr. 11, 1986

[30] Foreign Application Priority Data

Oct. 3, 1985 [JP] Japan .............................. 60-220849
Oct. 21, 1985 [JP] Japan .............................. 60-234908

[51] Int. Cl.⁴ .................................................. G01B 11/30
[52] U.S. Cl. ........................................ 356/376; 356/1; 73/146
[58] Field of Search .................... 356/1, 376, 371; 250/211 J, 211 K; 73/146

[56] References Cited

U.S. PATENT DOCUMENTS

| | | | |
|---|---|---|---|
| 3,423,527 | 1/1969 | Collins | 250/211 J |
| 3,612,890 | 10/1971 | Cornyn et al. | 356/376 |
| 4,567,347 | 1/1986 | Ito et al. | 356/376 |
| 4,601,574 | 7/1986 | Yamane et al. | 356/1 |
| 4,653,316 | 3/1987 | Fukuhara | 356/376 |

FOREIGN PATENT DOCUMENTS

| | | | |
|---|---|---|---|
| 17106 | 1/1984 | Japan | 356/371 |
| 231404 | 12/1984 | Japan | 356/376 |

OTHER PUBLICATIONS

Cantor, C. "Electro-Optical Sensor for Measuring Road Surface Texture" *Proceedings of the Society of Photo-Optical Instrumentations Engineers,* Conference, Washington, D.C., Apr. 17–18, 1979, pp. 127–135.

*Primary Examiner*—R. A. Rosenberger
*Attorney, Agent, or Firm*—Lowe, Price, LeBlanc, Becker & Shur

[57] ABSTRACT

A road surface illuminated by sunlight is scanned with a laser beam at right angles to the direction of travel, the intensity of the laser beam being intensity modulated with a predetermined frequency; laser beams reflected from the road surface are received and optically filtered to filter out light having frequencies outside that of the laser beam. The optically filtered laser beam strikes a plurality of beam position sensing elements from which respective electrical signals are derived. The resulting electrical signals are then multiplexed and electrically band-pass filtered wherein the center frequency of the band-pass filtering coincides with the frequency at which the laser beam is intensity modulated.

2 Claims, 4 Drawing Sheets

METHOD FOR MOBILE SURVEY OF ROAD SURFACE

BACKGROUND OF THE INVENTION

1. Field of the Invention

The present invention relates generally to a method for conducting mobile surveys of road surface, and more specifically to such a method for obtaining continuously image information of cracks, ruts and the like of the road surface from a moving vehicle. The information thus obtained is essentially free of detrimental influences by noise produced by daylight, light emitted from external light sources such as vehicle headlights etc. and therefore is suited for computer based automatic image data processing.

2. Description of the Prior Art

It is known in the art to successively obtain information of cracks, ruts and the likes of road surface while a vehicle is travelling in which a survey apparatus is mounted.

One known technique for detecting cracks and the like fissure type defects of road surface, has utilized an incandescent light or laser beam which is directed to the road surface at right angles to the direction in which a vehicle is travelling. The lights reflected on the road surface is then picked up at a movie or video camera in order to make optical records of the road surface. However, this prior art technique is limited to night use when there is little or no traffic. Further, the optical records are liable to be degraded by various undesired reflective objects such as white lane strips painted on the road surface and contaminated spots left thereon, etc. Accordingly, the optical records are not suited for automatic image data processing using computer.

On the other hand, in order to detect a profile of road such as ruts or wheel tracks, a combination of strobe lights and a pulse camera has been proposed to form "black hair lines" on the road surface. Alternatively, a laser beam is projected onto the road surface to make "bright hair lines" thereon which are recorded by a television camera for example. With these vehicle road surveys, like problems are pointed out that such surveys should be implemented at night. Further, the contrast of the black or bright hair line is readily influenced by the light emitted from the headlights of vehicles in near vicinity of the vehicle in which the survey apparatus is mounted.

SUMMARY OF THE INVENTION

It is an object of the present invention to provide a method for obtaining information of road surface defects such as cracks from a moving vehicle, which information is obtainable during the daytime and suited for computer based automatic data processing.

Another object of the present invention is to provide a method for obtaining information of a deteriorated profile such as ruts from a moving vehicle, which information is obtainable during the daytime and suited for computer based automatic data processing.

A first aspect of the present invention is to provide a method of obtaining information of cracks and the like in road surface utilizing a laser beam while a vehicle is travelling in which a road survey apparatus is mounted, the method comprising the steps: scanning the road surface with a laser beam at right angles to the direction in which the vehicle is travelling, the intensity of the laser beam being modulated with a predetermined frequency prior to the scanning; receiving the laser beams reflected on the road surface at first and second pickups; optically filtering the laser beams entering the first and second pickups in a manner to filter out light having frequencies outside of the frequency of the laser beam; converting the optically filtered laser beams obtained at the first and second pickups into first and second electrical signals, respectively; electrically band-pass filtering the first and second electrical signals wherein the center frequency of the band pass filtering coincides with the predetermined frequency, and demodulating the electrically filtered first and second signals; obtaining a ratio of the amplitudes of the demodulated first and second signals; and comparing the ratio with a predetermined threshold level for obtaining the information of cracks and the like of the road surface.

A second aspect of the present invention takes the form of a method of obtaining information of profiles of road such as ruts utilizing a laser beam while a vehicle is travelling in which a road survey apparatus is mounted, the method comprising the steps: scanning the road surface with a laser beam at right angles to the direction in which the vehicle is travelling; receiving the laser beam reflected on the road surface at a pickup; optically filtering the laser beam entering the pickup in a manner to filter out light having frequencies outside of the frequency of the laser beam; causing the optically filtered laser beam to scan a plurality of beam position sensing elements from which respective electrical signals are derived, each of the derived electrical signals representing the position at which the optically filtered beam strikes the element; electrically band-pass filtering each of the electrical signals wherein the center frequency of the band-pass filtering coincides with the frequency at which the laser beam is scanned; and multiplexing the electrically filtered signals for obtaining the information of profiles of the road such as ruts.

BRIEF DESCRIPTION OF THE DRAWINGS

The features and advantages of the present invention will become more clearly appreciated from the following description taken with the accompanying drawings in which.

DETAILED DESCRIPTION OF THE PREFERRED EMBODIMENTS

Figure 1:
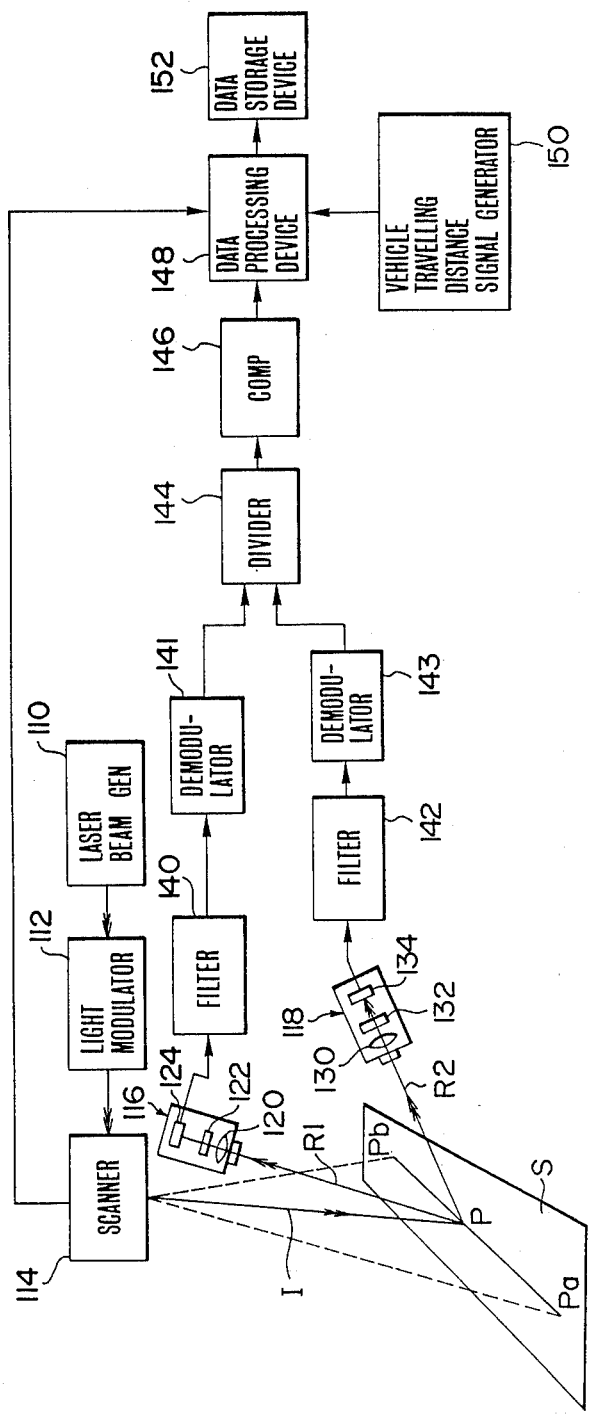
FIG. 1 is a schematic block diagram showing a first embodiment of the present invention used for examining cracks in road surface.

FIG. 1 shows in block diagram form a first embodiment of the present invention. This arrangement is mounted in a vehicle and designed to detect automatically cracks and the like fissure type defects in road surface while the vehicle is travelling.

In this embodiment a laser beam is continously produced by a laser generator 110. The light intensity (viz., amplitude) of the laser beam is modified with a predetermined frequency (e.g. 16 MHz) in a light modulator 112. The thus modulated laser beam is then fed to a light scanner 114 which scans a light spot P on road surface S along a scanning line (Pa - Pb) which spans a portion of the road surface S under examination. In this embodiment the scanning line is oriented essentially at right angles to the direction in which the vehicle in which the survey apparatus is disposed is travelling. The above mentioned scanner 114 takes a form of, by way of example, a polyhedron equipped with a plurality of reflecting surfaces and is rotated at a predetermined speed to provide the above-mentioned scanning. As this type of scanner device is well known, further description will be omitted for brevity.

The laser beam emitted by the scanner 114 (hereinafter referred to as the incident beam I) upon impinging on the road surface S, is reflected on the road surface S in accordance with the road conditions thereof. A first light pickup or light receiving means 116 is mounted in the vicinity of the light scanner 114 and hence receives a light beam R1 reflected at a small angle, while a second light pickup 118 is disposed so as to receive a light beam R2 reflected at a large angle. It should be noted the reflected beams R1 and R2 have been modified with the conditions of the road surface S such as cracks.

The light pickup 116 comprises a collection or converging lens 120, an optical filter 122 and a photo-electric converter 124 which converts the beam of light impinging thereon into a corresponding electrical signal. Similarly, the light pickup 118 comprises a collection lens 130, an optical filter 132 and a photo-electric converter 134 which functions in the same manner as its counterpart 124.

Each of the optical filters 122, 132 has the center frequency which is selected to coincide with that of the laser beam and hence allows the laser beam to pass therethrough. Each of the photo-electric converters 124, 134 is preferably a type having high frequency response characteristic and may take the form of an electron multiplier phototube or a photo diode. The photo-electric converters 124, 134 are respectively supplied with the outputs of the optical filters 122, 132 and produce corresponding electrical signals.

The outputs of photo-electric converters 124, 134 are respectively applied to electrical filters 140, 142, each of which has the center frequency equal to the frequency which has been utilized to modulate the laser beam in the modulator 112. Accordingly, each output of the electrical filters 140, 142 is an electrical signal which has the frequency equal to the laser beam modulating frequency and which has been modulated with the road surface conditions. Following this electric filtering, the outputs of the electric filters 140, 142 are then fed to respective demodulators 141, 143, wherein the carrier wave characteristics imparted on the laser beam in the modulator 112 are removed. In other words, each output of the demodulators 141, 143 represents the road surface conditions, and is essentially free of daylight and other noises.

The demodulated signals are then fed to a divider 144 wherein a ratio of the outputs of the demodulators 141, 143 is derived. The output of the divider 144, indicating the ratio, is then fed to a comparator 146 wherein the output of the divider 144 is compared with a predetermined threshold level.

In the event that the road surface under survey is free of flaws such as cracks and the like, the amount of light which enters each of the pickups 116, 118 is approximately equal or within a predetermined ratio. However, if the indicident beam I enters a crack or similar fissure, the amount of reflected beam which enters the pickup 116 tends to be markedly greater than that which enters the pickup 118. Viz., if the laser beam enters a crack it is very difficult for any of the reflected beam to be reflected at an angle suitable for pickup 118 to receive the same. Accordingly, in the event that the road surface being scanned is free of flaws, then the output of the divider circuit 144 (viz., the ratio) will be relatively low, while, in the case where the laser beam enters a crack, the different amount of light which tends to be reflected to the pickups 116, 118 induces the situation wherein a signal having a level higher than the above mentioned threshold level is received at the comparator 146.

It is therefore understood that if the intensities of the reflected beams are previously examined with various road surface conditions, the threshold level is empirically determined by which the signal applied to the comparator 146 can be determined whether it represents a crack and the like fissure type defects.

A data processing device 148 is arranged to receive the output of the comparator 146 and to sample same with a predetermined sampling rate, and is also supplied with the laser scanning data from the scanner 114 and a signal representative of vehicle travelling distances signal from a vehicle travelling distance signal generator 150. The signals from the blocks 114 and 150 are used to determine the degrees and locations of the detected cracks when the crack information is processed. A technique of spectrum analysis can be utilized in determining cracks in data processing device 148, which technique is useful in removing undesired information due to coarse or rough road surface which is not classified into the cracks.

The crack data thus obtained undergoes image data processing in the data processing device 150 using a computer provided therein, and thereafter stored in a suitable storage device 152 such as a magnetic tape or disc. As an alternative the image data processing can be implemented at a later time away from the vehicle, in the case of which the data prior to the image processing are stored in the data storage device 152. The image data processing itself is well known in the art and hence will not be discussed in detail.

Figure 2:
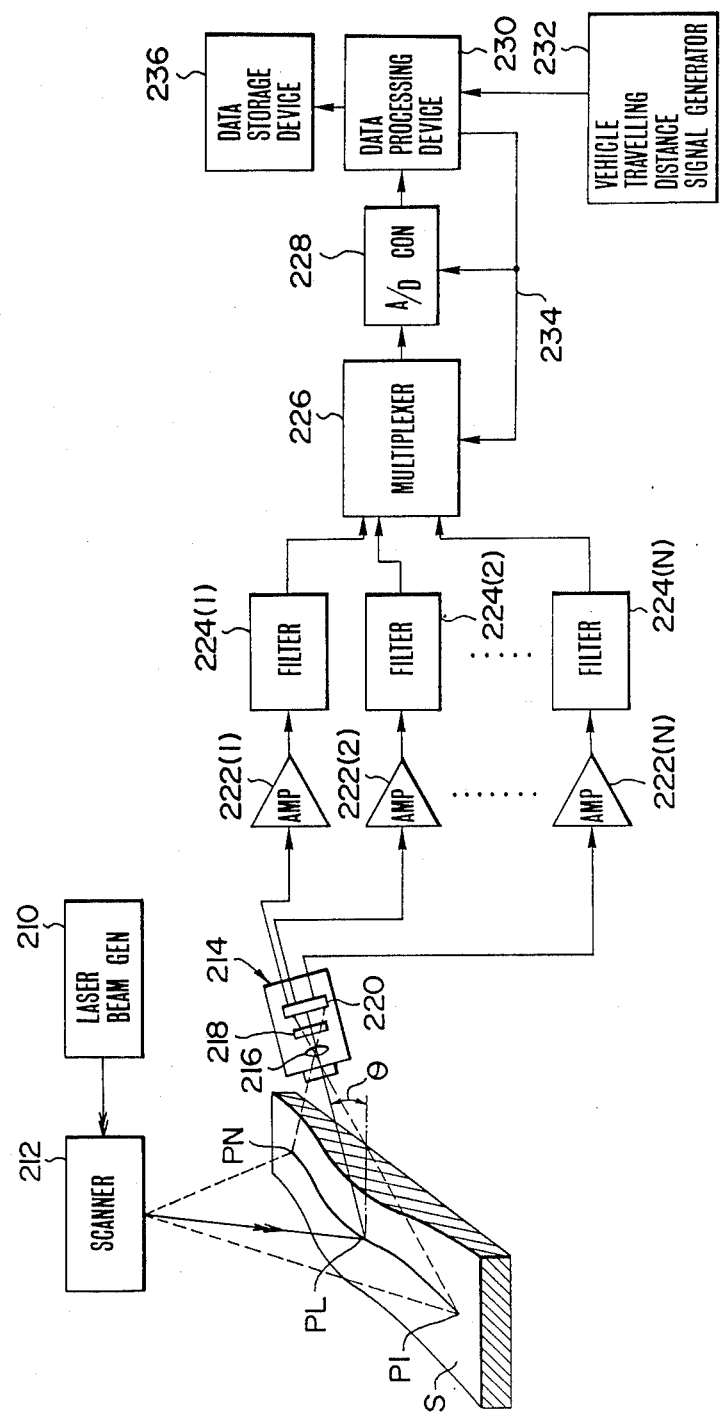
FIG. 2 is a block diagram showing a second embodiment of the present invention used for determining the profile of road surface.

FIG. 2 shows a second embodiment of the present invention. This embodiment is directed to determining the profile of the road surface under survey, and more specifically to obtaining image information of wheel tracks, ruts or the like.

In this embodiment the laser beam produced in a laser beam generator 210 is not modulated prior entering a scanner 212 and only a single reflected beam pickup 214 is used. This scanner has a construction similar to that used in the first embodiment, i.e. includes a rotatable polyhedron body on which a plurality of reflecting surfaces are provided. A scanning line Pl-PL-PN formed on the road surface S is oriented essentially at right angles to the direction in which the vehicle is travelling.

Figure 3:
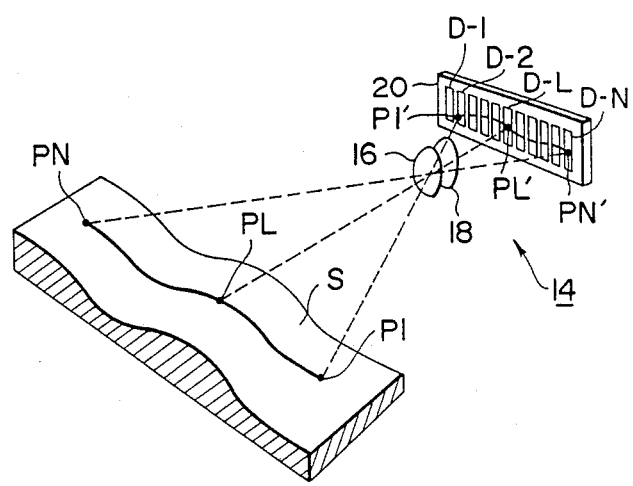
FIG. 3 is a schematic perspective view showing the beam impinging position sensing device via which the profile of road surface is determined with the second embodiment.

The pickup 214 includes a collection lens 216, an optical filter 218 and a beam impinging position sensor 220. The optical filter 218 performs the same function as those (122, 132) used in the first embodiment, viz., permits the laser beam to pass therethrough. As shown in FIG. 3, the sensor 220 of this embodiment is comprised of a plurality of elongate beam impinging position sensing elements D-1 to D-N each of which is a semiconductor element and varies the resistance thereof with the position (P1', PL'or PN') at which the beam of light impinges. Accordingly, the position of the light beam impinging on the semiconductor element can be specified by measuring the resistance thereof. The semiconductor element itself (D-1, D-2, ... or D-N) is known in the art and hence further description will be omitted for brevity.

As will be apparent from FIG. 2, the profile of the surface S under survey varies the angle 8 at which the reflected beam R enters the pickup 214. Accordingly, the scanned light beam which has passed through the lens 216 strikes the elements D-1 to D-N, one by one, at heights each of which varies with the profile of the road surface S.

The output of each of the beam impinging position sensing elements is fed to a corresponding amplifier. Viz., the outputs of the elements D-1 to D-N are supplied to amplifiers 222(1) to 222(N), respectively. The amplifiers 222(1) to 222(N) are respectively connected to filter circuits 224(1) to 224(N), each center frequency of which is selected to coincide with that at which the scanner 212 scans the road surface S. The electrical filtering at the filters 224(1) to 224(N) ensures that noise due to daylight (for example) entering the pickup 214 is essentially removed.

The outputs of the filter circuits 224(1) to 224(N) are fed to a multiplexer 226 which selectively applies the output of each filter circuit in turn to an A/D converter 228 which subsequently outputs a corresponding digital signal to a data processing device 230. In this embodiment, this circuit 230 receives a signal from a vehicle travelling distance signal generator 232 and outputs a control signal to the multiplexer 226 and the A/D converter circuit 228 via a control line 234.

The road profile data thus obtained undergoes data processing in the device 230 using a computer provided therein, and thereafter stored in a suitable storage device 236 similar to the device 152 of the first embodiment. The road profile data can of course be implemented at a later time away from the vehicle, in which case the data prior to the data processing are stored in the device 236.

The output of each optical filter of the first and second embodiments may contain daylight having the same frequency as that of the laser beam depending on the kind of laser beam utilized. However, almost all noise resulting from the incoming daylight can be removed in the electrical filters provided in the following stages.

An alternate arrangement of the first embodiment may take the form of an arrangement wherein the laser generator is arranged to directly modulate the laser beam and thus permits the omission of the modulator circuit 112 Further, it is possible to use two groups of pickups in place of the first and second pickups illustrated in FIG. 1. With this arrangement the average output of each group is fed to the corresponding filter circuit.

Figure 4:
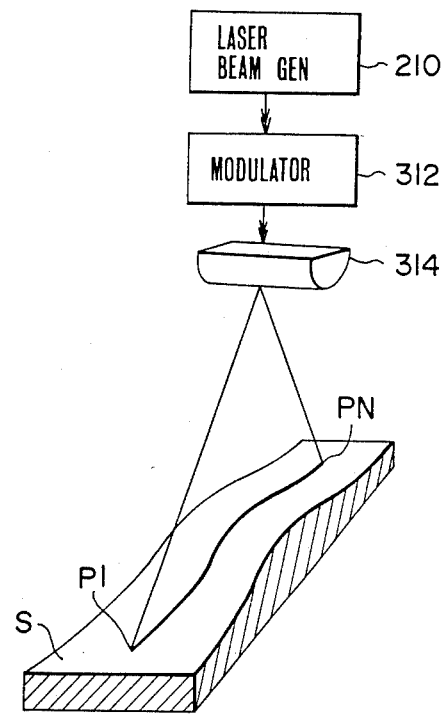
FIG. 4 is a schematic perspective view and block diagram showing a first modification of the second embodiment.
Figure 5:
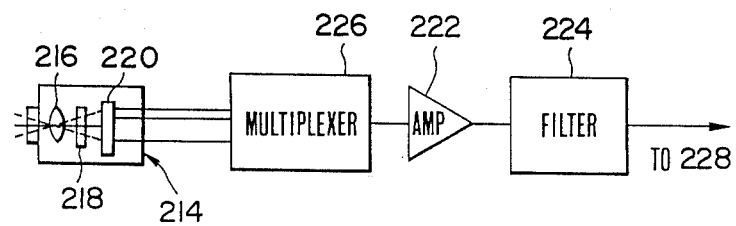
FIG. 5 is a block diagram showing a second modification of the second embodiment.

As shown in FIG. 4, an alternative form of second embodiment of the present invention takes the form of an arrangement wherein the scanner is replaced with a suitable diverging lens (cylindrical or semi-cylindrical lens) 314 which modifies the incoming laser beam into a fan shaped one which is beamed in the form of a fine line onto the surface of the road, and wherein the beam from the generator 210 is subject to modulation (at a modulator 312) prior to entry into the lens. In this embodiment the center frequency of the modulation is selected to correspond to the frequency at which the scanner of the second embodiment is arranged to operate. Still further, the positions of the scanner 212 and the light beam pickup 214 may be changed with each other. Furthermore, more accurate measurements of road profile can be obtained if more than one light beam pickups are provided. Another alternative form of second embodiment takes the form of an arrangement wherein the multiplexer 226 is arranged directly following the light beam pickup 214 as shown in FIG. 5. This modification enables each of the numbers of amplifiers 222(1)-222(N) and filters 224(1)-224(N) to reduce to one, and is preferable when the numbers of amplifiers and filters are increased with the second embodiment shown in FIG. 2.

The embodiments disclosed hereinabove are exemplary of the concept of the present invention which is limited only by the appended claims.

What is claimed is:

1. A method of obtaining information of cracks and the like in road surface utilizing a laser beam while a vehicle is travelling in which a road survey apparatus is mounted, said method comprising the steps:
    scanning the road surface with a laser beam at right angles to the direction in which the vehicle is travelling, the intensity of said laser beam being modulated with a predetermined frequency prior to the scanning;
    receiving the laser beams reflected on said road surface at first and second pickups;
    optically filtering the laser beams entering said first and second pickups in a manner to filter out light having frequencies outside of the frequency of the laser beam;
    converting the optically filtered laser beams obtained at said first and second pickups into first and second electrical signals, respectively;
    electrically band-pass filtering said first and second electrical signals wherein the center frequency of said band pass filtering coincides with said predetermined frequency, and demodulating the electrically filtered first and second signals;
    obtaining a ratio of the amplitudes of the demodulated first and second signals, and
    comparing said ratio with a predetermined threshold level for obtaining the information of cracks and the like of the road surface.

2. A method as claimed in claim 1, wherein a vehicle travelling distance is used to determine the locations of the cracks and the like following the step of comparing.

* * * * *